(12) United States Patent
Koravadi

(10) Patent No.: US 10,032,369 B2
(45) Date of Patent: Jul. 24, 2018

(54) VEHICLE VISION SYSTEM WITH TRAFFIC MONITORING AND ALERT

(71) Applicant: MAGNA ELECTRONICS INC., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 224 days.

(21) Appl. No.: 14/996,570

(22) Filed: Jan. 15, 2016

(65) Prior Publication Data

US 2016/0210853 A1 Jul. 21, 2016

Related U.S. Application Data

(60) Provisional application No. 62/103,591, filed on Jan. 15, 2015.

(51) Int. Cl.
| | |
|---|---|
| *H04N 7/18* | (2006.01) |
| *G08G 1/01* | (2006.01) |
| *G06K 9/00* | (2006.01) |
| *G08G 1/0967* | (2006.01) |

(52) U.S. Cl.
CPC ....... *G08G 1/0141* (2013.01); *G06K 9/00791* (2013.01); *G08G 1/0112* (2013.01); *G08G 1/0116* (2013.01); *G08G 1/0133* (2013.01); *G08G 1/096716* (2013.01); *G08G 1/096741* (2013.01); *G08G 1/096775* (2013.01); *G08G 1/096791* (2013.01); *H04N 7/18* (2013.01); *H04N 7/181* (2013.01); *G06K 9/00785* (2013.01)

(58) Field of Classification Search
None
See application file for complete search history.

(56) References Cited

U.S. PATENT DOCUMENTS

| | | |
|---|---|---|
| 4,088,937 A | 5/1978 | Uchida et al. |
| 5,550,677 A | 8/1996 | Schofield et al. |
| 5,595,271 A | 1/1997 | Tseng |
| 5,670,935 A | 9/1997 | Schofield et al. |
| 5,760,962 A | 6/1998 | Schofield et al. |
| 5,796,094 A | 8/1998 | Schofield et al. |
| 5,877,897 A | 3/1999 | Schofield et al. |
| 5,949,331 A | 9/1999 | Schofield et al. |

(Continued)

*Primary Examiner* — Eileen M Adams
(74) *Attorney, Agent, or Firm* — Honigman Miller Schwartz and Cohn, LLP

(57) ABSTRACT

A vision and alert system of a vehicle includes a plurality of cameras configured to be disposed at a vehicle equipped with the vision and alert system so as to have respective fields of view exterior of the vehicle. The plurality of cameras, when disposed at the vehicle, includes a forward camera having a field of view forward of the vehicle. An image processor is operable to process image data captured by at least the forward camera. Responsive to image processing of captured image data when the cameras are disposed at the vehicle, the image processor is operable to determine a traffic condition on the road being traveled by the equipped vehicle. Responsive to the determined traffic condition being indicative of a threshold level of a traffic jam, the vision and alert system transmits a traffic alert communication to a remote system.

16 Claims, 6 Drawing Sheets

(56) References Cited

U.S. PATENT DOCUMENTS

| | | |
|---|---|---|
| 6,129,411 A | 10/2000 | Neff |
| 6,201,642 B1 | 3/2001 | Bos |
| 6,396,397 B1 | 5/2002 | Bos et al. |
| 6,405,132 B1 | 6/2002 | Breed et al. |
| 6,636,258 B2 | 10/2003 | Strumolo |
| 6,690,268 B2 | 2/2004 | Schofield et al. |
| 6,693,517 B2 | 2/2004 | McCarthy et al. |
| 6,975,246 B1 | 12/2005 | Trudeau |
| 7,005,974 B2 | 2/2006 | McMahon et al. |
| 7,038,577 B2 | 5/2006 | Pawlicki et al. |
| 7,145,519 B2 | 12/2006 | Takahasi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,580,795 B2 | 8/2009 | McCarthy et al. |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,881,496 B2 | 2/2011 | Camilleri et al. |
| 8,892,345 B2 | 11/2014 | Arcot et al. |
| 9,218,001 B2 | 12/2015 | Lee |
| 9,478,129 B1 | 10/2016 | Kothari et al. |
| 9,729,636 B2 | 8/2017 | Koravadi et al. |
| 2003/0025597 A1* | 2/2003 | Schofield ............... B60Q 1/346 340/435 |
| 2003/0095039 A1 | 5/2003 | Shimomura et al. |
| 2006/0254142 A1 | 11/2006 | Das et al. |
| 2007/0032245 A1 | 2/2007 | Alapuranen |
| 2009/0033474 A1 | 2/2009 | Chen |
| 2010/0085171 A1 | 4/2010 | Do |
| 2010/0156668 A1* | 6/2010 | Lee ....................... G08G 1/0104 340/905 |
| 2011/0032119 A1 | 2/2011 | Pfeiffer et al. |
| 2011/0112720 A1 | 5/2011 | Keep et al. |
| 2012/0062743 A1 | 3/2012 | Lynam et al. |
| 2012/0065858 A1 | 3/2012 | Nickolaou |
| 2012/0218412 A1 | 8/2012 | Dellantoni et al. |
| 2013/0116859 A1 | 5/2013 | Ihlenburg et al. |
| 2013/0124073 A1* | 5/2013 | Ren .......................... G08G 1/00 701/118 |
| 2013/0342333 A1 | 12/2013 | Hutchings |
| 2014/0032091 A1 | 1/2014 | Arcot et al. |
| 2014/0088796 A1 | 3/2014 | Lee |
| 2014/0195068 A1 | 7/2014 | Boss et al. |
| 2014/0195138 A1 | 7/2014 | Stelzig et al. |
| 2014/0218529 A1 | 8/2014 | Mahmoud |
| 2014/0222323 A1 | 8/2014 | Purushothaman |
| 2014/0253345 A1 | 9/2014 | Breed |
| 2014/0309806 A1 | 10/2014 | Ricci |
| 2014/0309864 A1 | 10/2014 | Ricci |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0228188 A1 | 8/2015 | Macfarlane et al. |
| 2015/0232065 A1 | 8/2015 | Ricci et al. |
| 2015/0251599 A1 | 9/2015 | Koravadi |
| 2015/0352953 A1 | 12/2015 | Koravadi |
| 2016/0260328 A1 | 9/2016 | Mishra |
| 2016/0358477 A1 | 12/2016 | Ansari |

* cited by examiner

VEHICLE VISION SYSTEM WITH TRAFFIC MONITORING AND ALERT

CROSS REFERENCE TO RELATED APPLICATION

The present application claims the filing benefits of U.S. provisional application Ser. No. 62/103,591, filed Jan. 15, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Also, communication systems for vehicles may provide for communication between vehicles and/or between a vehicle and a remote server. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Examples of such systems are described in U.S. Pat. No. 7,580,795, which is hereby incorporated herein by reference in its entirety.

SUMMARY OF THE INVENTION

The present invention provides a vision system or imaging system for a vehicle that utilizes one or more cameras (preferably one or more CMOS cameras) to capture image data representative of images exterior of the equipped vehicle, and provides a determination of a traffic condition at or near the equipped vehicle and an alert to a remote server or cloud (such as via a vehicle-to-vehicle communication link or a vehicle-to-infrastructure communication link or 4G/LTE/5G link) when the determined traffic condition is above a threshold level or periodically update the traffic condition to the cloud service, and this information could be used by other vehicles or users of the cloud service. The remote system may communicate an alert to other vehicles (such as other vehicles associated with the alert system of the present invention) to alert the other drivers of the traffic jam condition.

The communication from the equipped vehicle to the remote server may include geographical location information (such as responsive to a GPS system of the vehicle), whereby the alert communication from the remote system to the other vehicles may only be communicated to other vehicles within a threshold vicinity of the equipped vehicle and the determined traffic condition. For example, the alert communication may be communicated to vehicles within a threshold distance from the location of the equipped vehicle or vehicles following a navigation route that approaches the location of the equipped vehicle. The vision system may automatically detect an accident scenario and update the cloud service with the type of accident and location of the accident.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
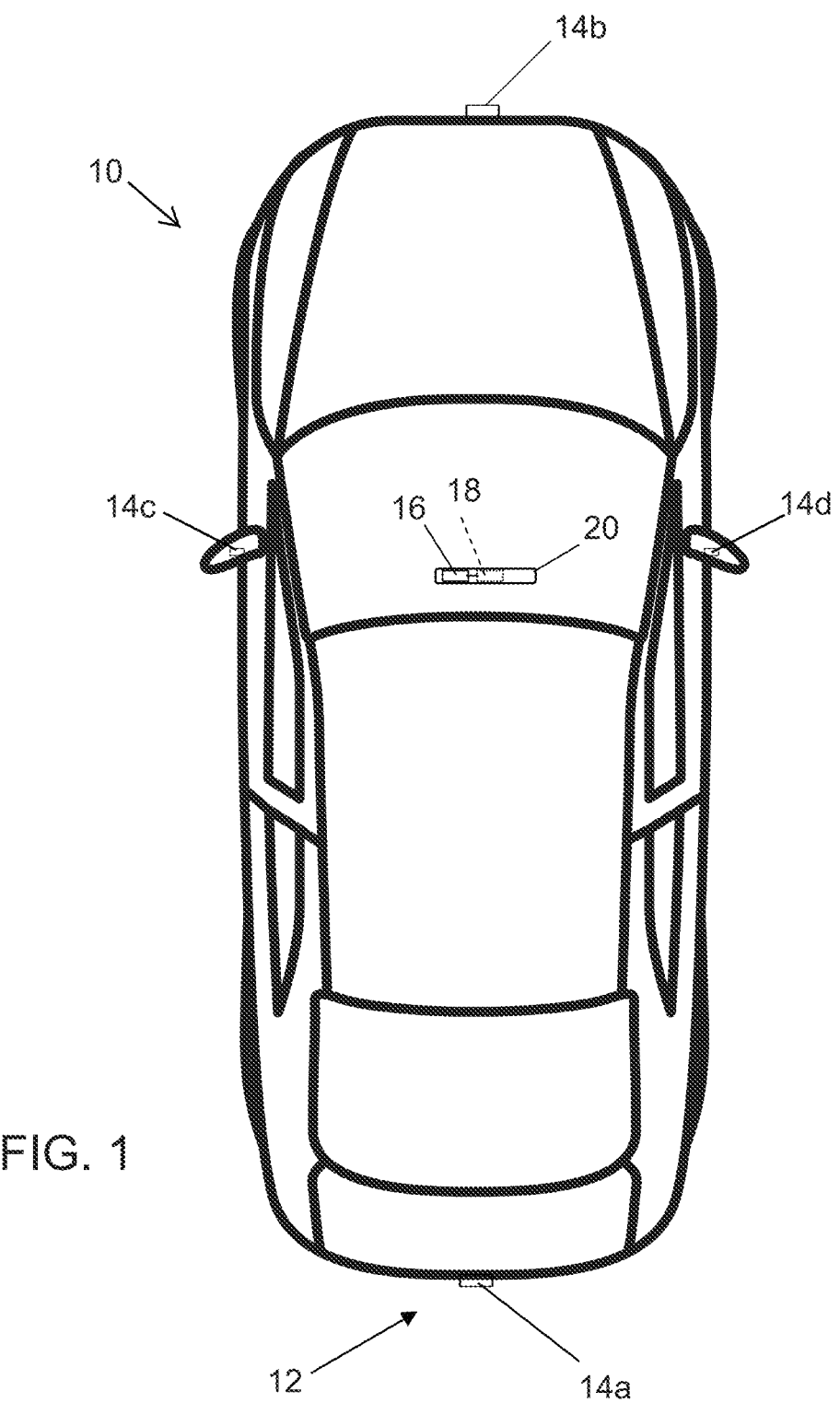
FIG. 1 is a plan view of a vehicle with a vision system that incorporates cameras in accordance with the present invention.

Referring now to the drawings and the illustrative embodiments depicted therein, a vehicle 10 (the subject vehicle or SV) includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
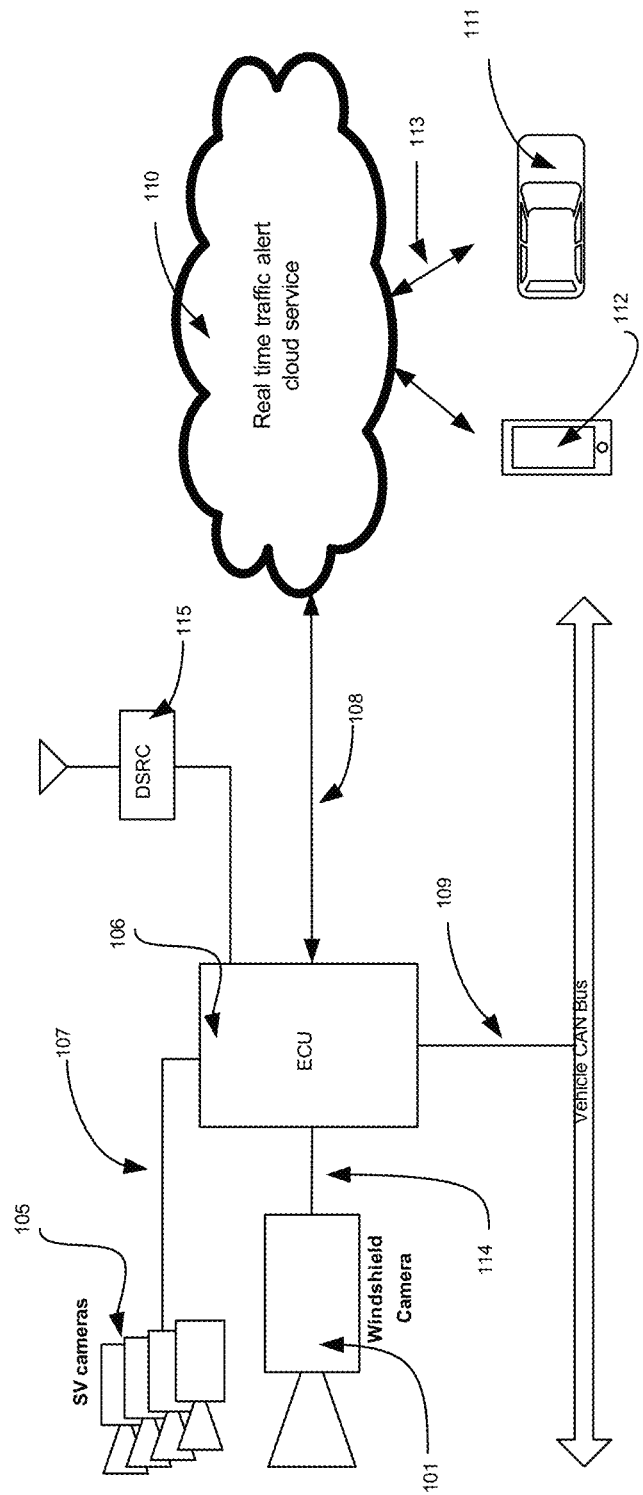
FIG. 2 is a block diagram of the vision system with traffic monitoring and traffic alert functions in accordance with the present invention.

The traffic jam monitor and update module of the present invention is connected to a plurality of vehicle cameras, including a windshield camera 101 and other exterior viewing cameras 105 (SV cameras), and is connected to a vehicle network bus 109 (such as a vehicle CAN bus) and a remote service 110, such as a cloud service) using high speed data 108 (4G/LTE/5G)//V2X link 115, such as shown in FIG. 2. The module or system may include a control or ECU 106 that is in communication with the windshield camera 101 via a link or connection 114 and with the other SV cameras 105 via respective links or connections 107. The control may also communicate via a designated short range communication (DSRC) for the V2V or V2X link 115. The cloud service 110 communicates with other devices, such as a mobile device or smart phone 112 and other vehicles 111 (via wireless communication links 113).

Using the windshield and SV cameras (which may include sideward viewing cameras and/or rearward viewing cameras or the like), the traffic jam monitor and update (TJMU) algorithm detects traffic jam situation via image processing of image data captured by the vehicle cameras.

The TJMU algorithm utilizes the captured image data and the driving pattern of the subject vehicle (such as the SV braking, accelerating and vehicle speed, pitch, yaw, roll and/or the like) and computes a traffic jam index between 0-10, where 0 is representative of a very low traffic jam (little to no traffic) and 10 is high (many vehicles on the road being traveled by the SV).

The TJMU algorithm and system transmits the SV location information (such as using a GPS system of the subject vehicle to determine the SV location) and the determined traffic jam index at real time using the high speed data link or V2X link to provide a real time traffic alert cloud service.

Figure 3:
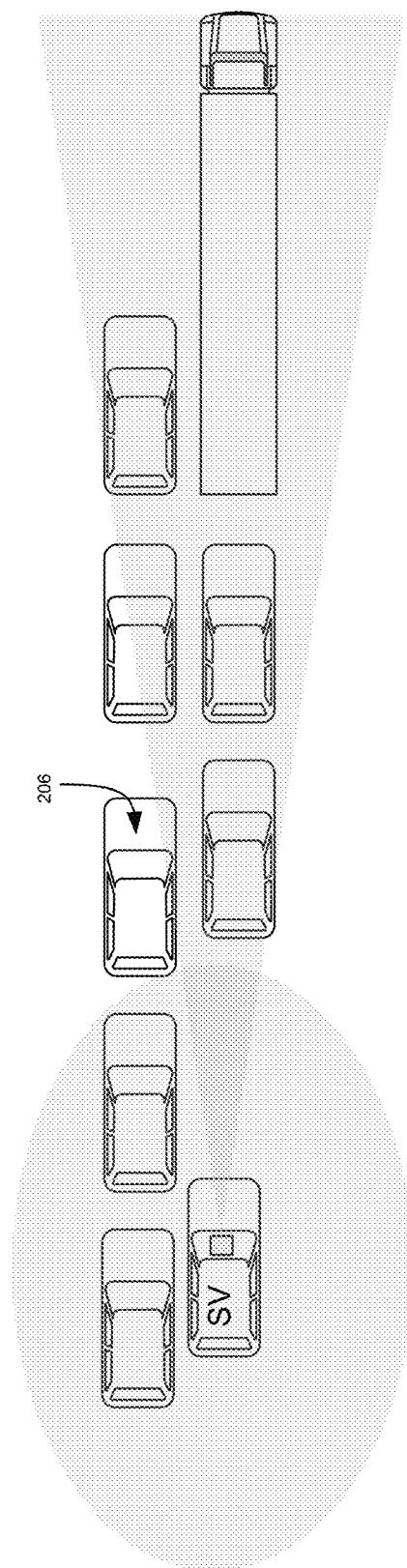
FIG. 3 is a plan view of a vehicle equipped with the system of the present invention with the vehicle shown in a high traffic condition.

Subscribed users (users of mobile devices or vehicles 206, such as the user of the vehicle (SV) in FIG. 3) for the real time traffic alert cloud service then receive the real time alert of the traffic situation. The subscribed users may only receive the alerts if the particular user is at or near or approaching the determined traffic jam location (such as within two miles of the traffic jam location or within a mile of the traffic jam location or within a ½ mile of the traffic jam location or thereabouts) or is following a navigation route that intersects or approaches the determined traffic jam location.

Figure 4:
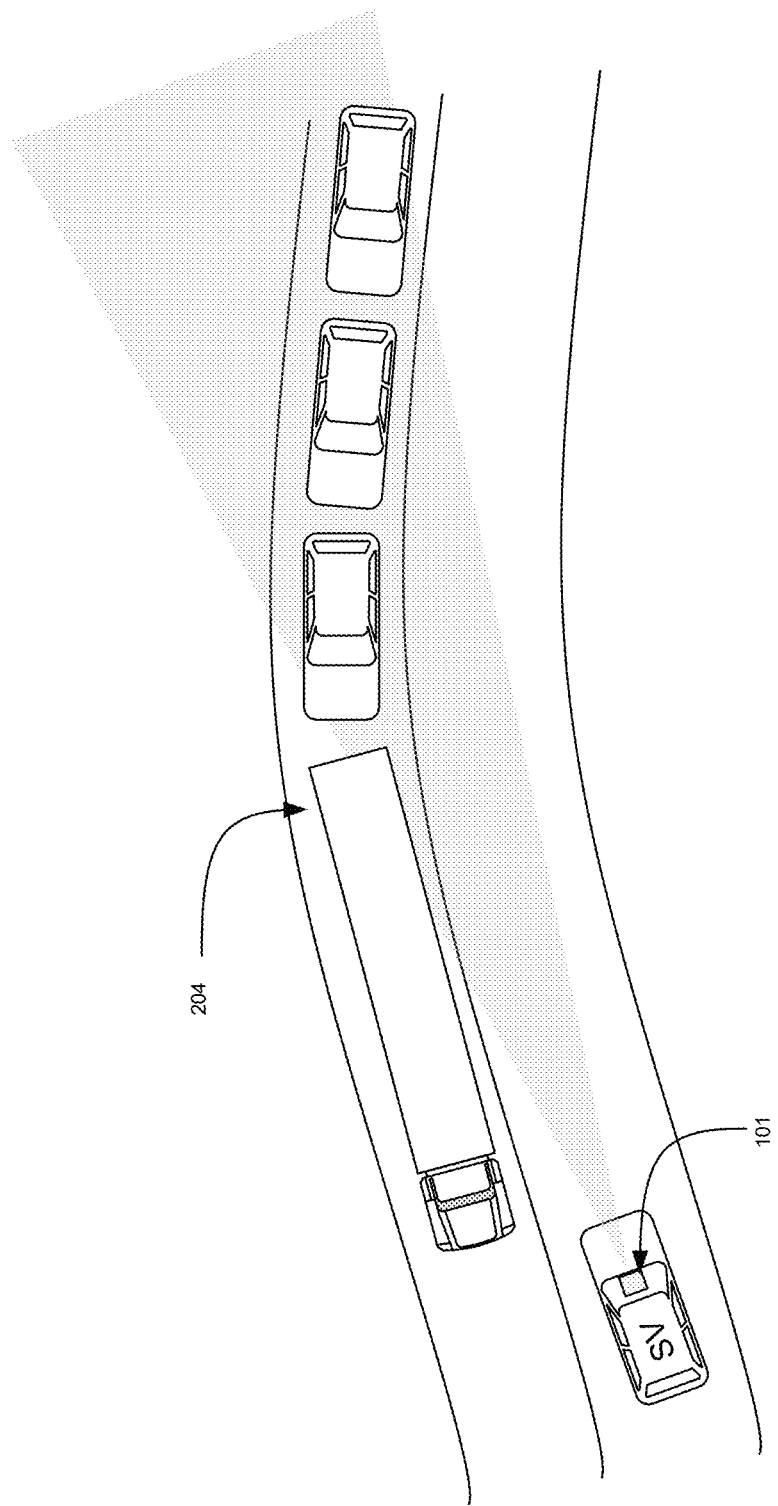
FIG. 4 is a plan view of a vehicle equipped with the system of the present invention with the vehicle shown capturing image data representative of a high traffic condition in a lane with vehicles traveling in a direction opposite to the equipped vehicle.

In many situations, it will be better if the users are alerted of a traffic jam in the freeway in advance before the user enters the freeway. As can be seen with reference to FIG. 4, the TJMU algorithm of the present invention (as shown in the subject vehicle SV) may be operable to detect a traffic jam condition of oncoming traffic 204 in the freeway using the windshield camera 101 and may generate an alert and communicate the alert using the V2X (such as V2V or V2I) link to alert the traffic that is about to enter the freeway. The system may determine a traffic jam or traffic condition or accident involving other vehicles on another road or lane near the road being traveled by the vehicle, such as on lanes of a highway or freeway with traffic moving in the opposite direction of the subject vehicle, or other vehicles on another road that intersects the road being traveled by the subject vehicle.

Figure 5:
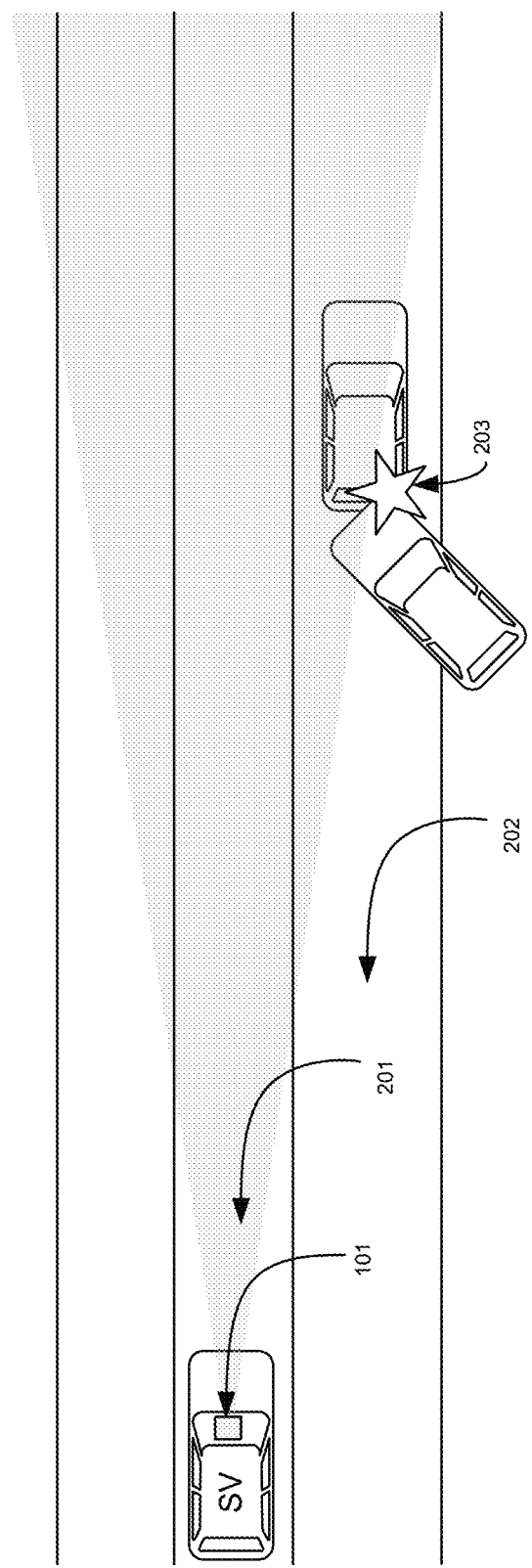
FIG. 5 is a plan view of a vehicle equipped with the system of the present invention with the vehicle shown capturing image data representative of a collision of two other vehicles ahead of the equipped vehicle.

Optionally, and with reference to FIG. 5, the TJMU algorithm may detect an accident scenario 203 (such as an accident involving one or more other vehicles in a lane 202 adjacent to the lane 201 traveled by the subject vehicle SV) utilizing the windshield camera 101 and may update the information to the cloud in real time along with the GPS location information. For example, an accident alert or communication (pertaining to a determined accident involving another vehicle or vehicles) may be periodically transmitted to the remote server or cloud to provide updates on the accident or traffic condition. The accident alert may include information pertaining to the accident, including geographical location information pertaining to the location of the accident (such as determined via a GPS system of the vehicle).

Figure 6:
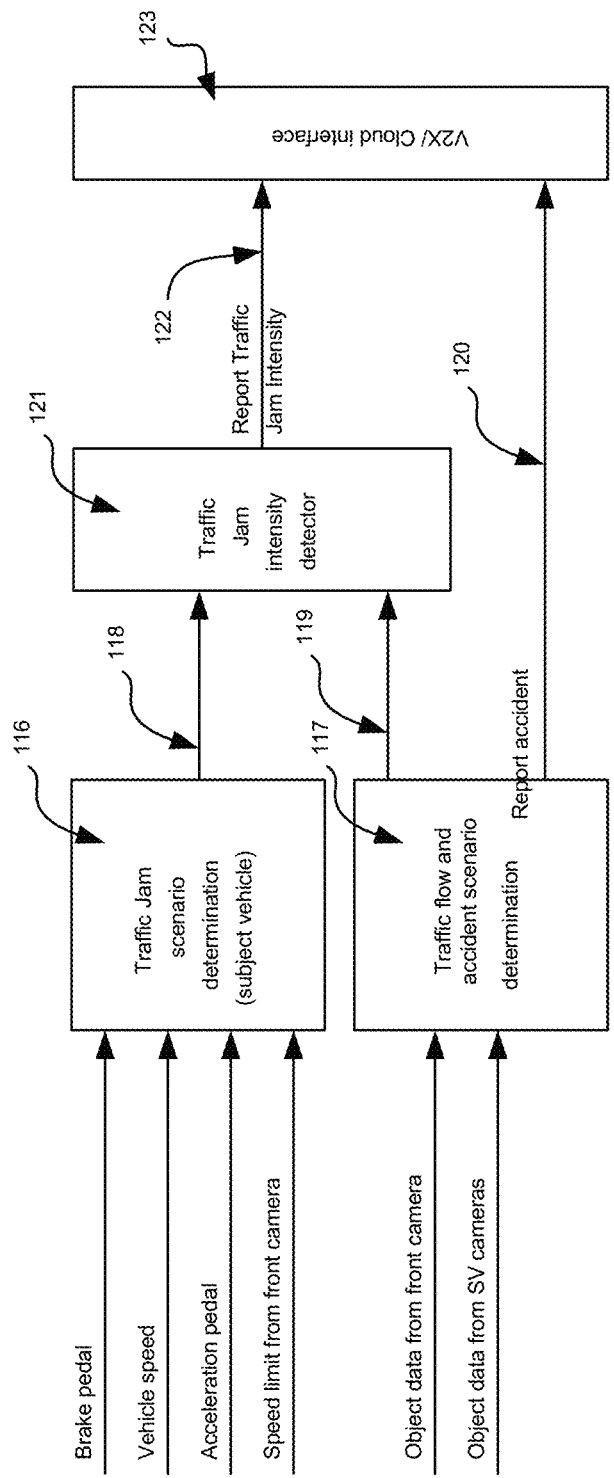
FIG. 6 is a block diagram of the vision system with traffic jam determination in accordance with the present invention.

As can be seen with reference to FIG. 6, the module 116 determines the traffic jam scenario depending on the driving pattern of the driver (such as application of the vehicle brake pedal or accelerator pedal and the vehicle speed, pitch, yaw and/or roll, such as may be determined by one or more sensors of the vehicle) with respect to the speed limit information, and outputs the traffic jam index output 118. The traffic flow and accident scenario determination module 117 utilizes the windshield camera and surround view system camera and determines the traffic jam index 119. The traffic jam intensity detector module 121 fuses the outputs of the modules 116, 117, and generates the final traffic jam intensity index 122 which will be transmitted to the cloud or V2X infrastructure via V2X/Cloud interface 123 in real-time. The traffic alert may be periodically transmitted to provide updates as to the traffic jam level or index (such as current speed of travel of vehicles in the traffic jam or the like), with the updates including the current geographical location of the vehicle and traffic jam. Responsive to a determination of an accident by the module 117, the accident may be reported via communication 120 to the cloud or V2X infrastructure via V2X/Cloud interface 123.

Thus, the present invention provides a system that determines a traffic condition ahead of and on the road being traveled by the equipped vehicle and, if the determined traffic condition is indicative of a threshold level of a traffic jam (such as, for example, if the traffic rating or index is above a 5), the system generates a communication via the V2I link to the remote server or service, whereby other users of the system may receive an alert of the traffic jam condition. For example, another user may receive the alert if the other user is at or near the traffic jam location or following a selected path towards the traffic jam location or the like. The system may also utilize a V2V communication link to communicate immediate traffic jam conditions to vehicles in the vicinity of the equipped vehicle, such as to alert the drivers of other vehicles of a traffic jam on a highway, so that the other drivers can avoid entering the on-ramp of the highway.

The vehicle communication systems may utilize aspects of the systems described in U.S. Pat. Nos. 6,690,268; 6,693,517; 7,156,796 and/or 7,580,795, and/or U.S. Publication Nos. US-2012-0218412, US-2012-0062743, US-2015-0158499; US-2015-0124096 and/or US-2015-0352953, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device that utilizes aspects of the display systems described in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187; 7,329,013; 7,308,341; 7,289,037; 7,249,860; 7,004,593; 6,690,268; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision and alert system of a vehicle, said vision and alert system comprising:
   a plurality of cameras configured to be disposed at a vehicle equipped with said vision and alert system so as to have respective fields of view exterior of the vehicle;
   wherein, with said cameras disposed at the equipped vehicle, said plurality of cameras includes a forward camera having a field of view forward of the equipped vehicle;
   an image processor operable to process image data captured by said cameras;
   wherein said vision and alert system determines a driving pattern of the equipped vehicle via at least one of (a) image processing of image data captured by at least said forward viewing camera when said cameras are disposed at the equipped vehicle and (b) one or more sensors of the vehicle sensing vehicle acceleration, vehicle speed, vehicle pitch, vehicle yaw and/or vehicle roll;
   wherein, responsive to the determined driving pattern of the equipped vehicle, said vision and alert system determines a traffic jam index representative of a degree of traffic on the road being traveled by the equipped vehicle; and
   wherein, responsive to the determined traffic jam index being greater than a threshold level of traffic, said vision and alert system transmits a traffic alert communication to a remote system, and wherein the traffic alert communication is indicative of the determined traffic jam index.

2. The vision and alert system of claim 1, wherein the traffic alert communication is transmitted to the remote system via a vehicle-to-infrastructure communication link.

3. The vision and alert system of claim 2, wherein the remote system is operable to transmit the traffic alert communication via a vehicle-to-infrastructure communication link to other vehicles.

4. The vision and alert system of claim 3, wherein the remote system transmits the traffic alert communication to other vehicles that are at or near or approaching the location of the determined traffic.

5. The vision and alert system of claim 3, wherein the remote system transmits the traffic alert communication to other vehicles that are following a navigation route that approaches the location of the determined traffic.

6. The vision and alert system of claim 1, wherein the traffic alert communication includes location information pertaining to the current geographical location of the equipped vehicle.

7. The vision and alert system of claim 1, wherein, responsive to image processing of captured image data, said image processor determines a traffic condition on another road being traveled by other vehicles.

8. The vision and alert system of claim 7, wherein the traffic alert communication is transmitted to other vehicles near the equipped vehicle via a vehicle-to-vehicle communication link.

9. The vision and alert system of claim 1, wherein, responsive to image processing of captured image data, said image processor is operable to determine a vehicle accident involving another vehicle, and wherein, responsive to determination of a vehicle accident, said vision and alert system transmits an accident alert communication to the remote system, and wherein the accident alert communication includes information pertaining to the geographical location of the vehicle accident.

10. A vision and alert system of a vehicle, said vision and alert system comprising:
   a plurality of cameras configured to be disposed at a vehicle equipped with said vision and alert system so as to have respective fields of view exterior of the vehicle;
   wherein, with said cameras disposed at the equipped vehicle, said plurality of cameras includes a forward camera having a field of view forward of the equipped vehicle;
   an image processor operable to process image data captured by said cameras;
   wherein said vision and alert system determines a driving pattern of the equipped vehicle at least in part via (a) image processing of image data captured by at least said forward viewing camera when said cameras are disposed at the equipped vehicle and (b) one or more sensors of the vehicle sensing vehicle acceleration, vehicle speed, vehicle pitch, vehicle yaw and/or vehicle roll;
   wherein, responsive to the determined driving pattern of the equipped vehicle, said vision and alert system determines a traffic jam index representative of the degree of traffic on the road being traveled by the equipped vehicle;
   wherein, responsive to the determined traffic jam index being greater than a threshold level of traffic, said vision and alert system transmits a traffic alert communication to a remote system, and wherein the traffic alert communication is indicative of the determined traffic jam index;
   wherein the traffic alert communication is transmitted to the remote system via a vehicle-to-infrastructure communication link; and
   wherein the traffic alert communication includes location information pertaining to the current geographical location of the equipped vehicle.

11. The vision and alert system of claim 10, wherein the remote system is operable to transmit the traffic alert communication via a vehicle-to-infrastructure communication link to other vehicles.

12. The vision and alert system of claim 11, wherein at least one of (i) the remote system transmits the traffic alert communication to other vehicles that are at or near or approaching the location of the determined traffic, and (ii) the remote system transmits the traffic alert communication to other vehicles that are following a navigation route that approaches the location of the determined traffic.

13. The vision and alert system of claim 10, wherein, responsive to image processing of captured image data, said image processor determines a traffic condition on another road being traveled by other vehicles, and wherein the traffic alert communication is transmitted to other vehicles near the equipped vehicle via a vehicle-to-vehicle communication link.

14. A vision and alert system of a vehicle, said vision and alert system comprising:
  a plurality of cameras configured to be disposed at a vehicle equipped with said vision and alert system so as to have respective fields of view exterior of the vehicle;
  wherein, with said cameras disposed at the equipped vehicle, said plurality of cameras includes a forward camera having a field of view forward of the equipped vehicle;
  an image processor operable to process image data captured by said cameras;
  wherein said vision and alert system determines a driving pattern of the equipped vehicle via at least one of (a) image processing of image data captured by at least said forward viewing camera when said cameras are disposed at the equipped vehicle and (b) one or more sensors of the vehicle sensing vehicle acceleration, vehicle speed, vehicle pitch, vehicle yaw and/or vehicle roll;
  wherein, responsive to the determined driving pattern of the equipped vehicle, said vision and alert system determines a traffic jam index representative of a degree of traffic on the road being traveled by the equipped vehicle;
  wherein, responsive to the determined traffic jam index being greater than a threshold level of traffic, said vision and alert system transmits a traffic alert communication to a remote system, and wherein the traffic alert communication is indicative of the determined traffic jam index; and
  wherein the traffic alert communication includes location information pertaining to the current geographical location of the equipped vehicle.

15. The vision and alert system of claim 14, wherein the traffic alert communication is transmitted to the remote system via a vehicle-to-infrastructure communication link, and wherein the remote system is operable to transmit the traffic alert communication via a vehicle-to-infrastructure communication link to other vehicles, and wherein the remote system transmits the traffic alert communication to other vehicles that are at or near or approaching the location of the determined traffic jam, and wherein the remote system transmits the traffic alert communication to other vehicles that are following a navigation route that approaches the location of the determined traffic jam.

16. The vision and alert system of claim 14, wherein, responsive to image processing of captured image data, said image processor determines a traffic condition on another road being traveled by other vehicles, and wherein the traffic alert communication is transmitted to other vehicles near the equipped vehicle via a vehicle-to-vehicle communication link.

* * * * *